July 26, 1932.  M. E. KING  1,869,154
DIFFERENTIAL DRIVE MECHANISM FOR AUTOMOBILES
Filed April 29, 1931  2 Sheets-Sheet 1

Inventor,
Manly E. King
by Walter P. Geyer
Attorney.

July 26, 1932.  M. E. KING  1,869,154
DIFFERENTIAL DRIVE MECHANISM FOR AUTOMOBILES
Filed April 29, 1931   2 Sheets-Sheet 2
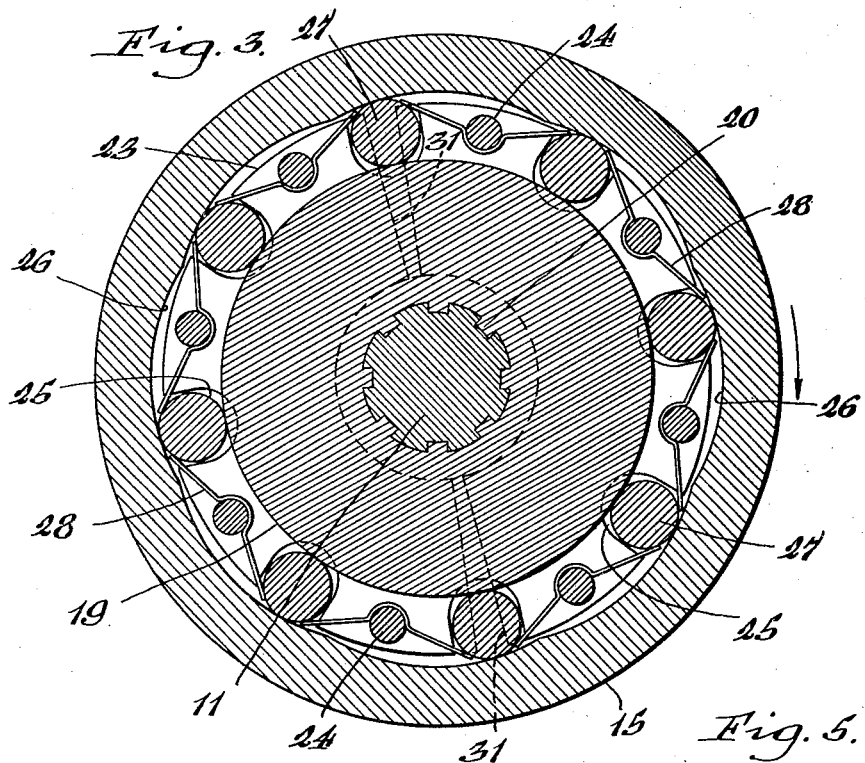
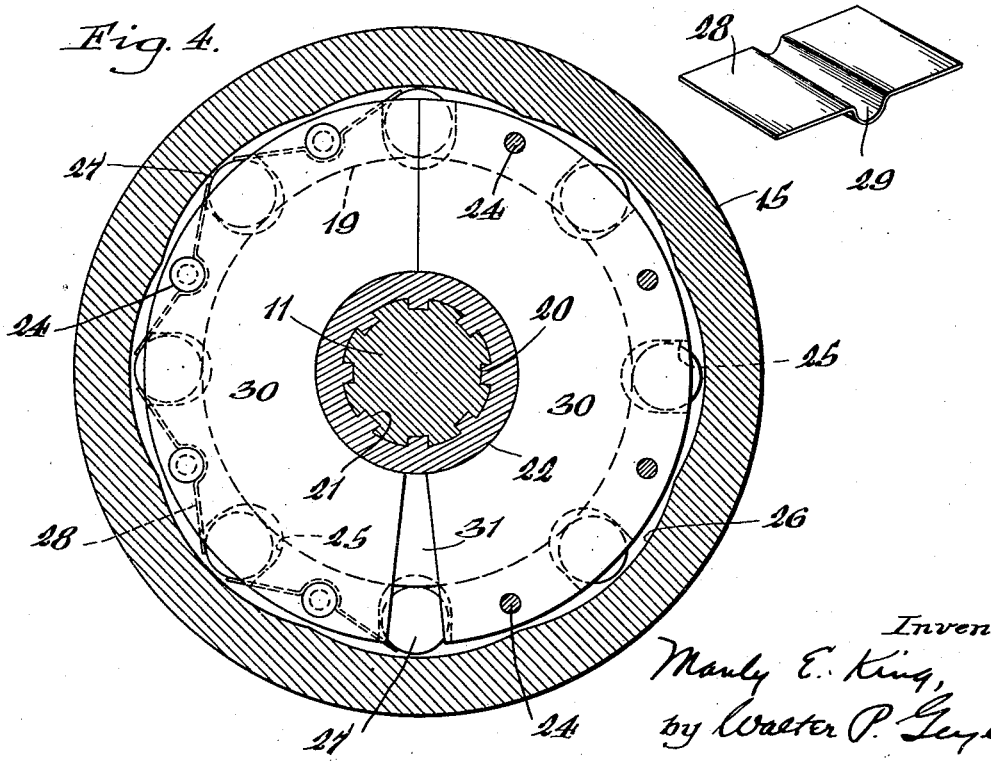

Patented July 26, 1932

1,869,154

UNITED STATES PATENT OFFICE

MANLY E. KING, OF SPRINGVILLE, NEW YORK

DIFFERENTIAL DRIVE MECHANISM FOR AUTOMOBILES

Application filed April 29, 1931. Serial No. 533,734.

This invention relates to improvements in a differential drive mechanism for automobiles.

One of its objects is the provision of an efficient and reliable mechanism of this character which will provide a positive and independent drive to both rear driving wheels in a forward or backward direction, and which will at the same time effectually permit the differential action required when turning corners and the relative movement of the axle-sections in accordance with the resistance offered to the traction wheels.

Another object of the invention is to provide a gearless differential drive mechanism which is simple, inexpensive and durable in construction, whose parts are so designed and organized as to afford positive operation at all times, and which can be readily applied to the axles and housings of existing automobiles without in any way altering their construction.

A still further object of the invention is to provide simple and positive means for effectually controlling the action of the elements which govern the differential action of the mechanism.

Other features of the invention reside in the combination and arrangement of parts hereinafter more fully described and particularly pointed out in the appended claims.

In the accompanying drawings:—

Figure 1:
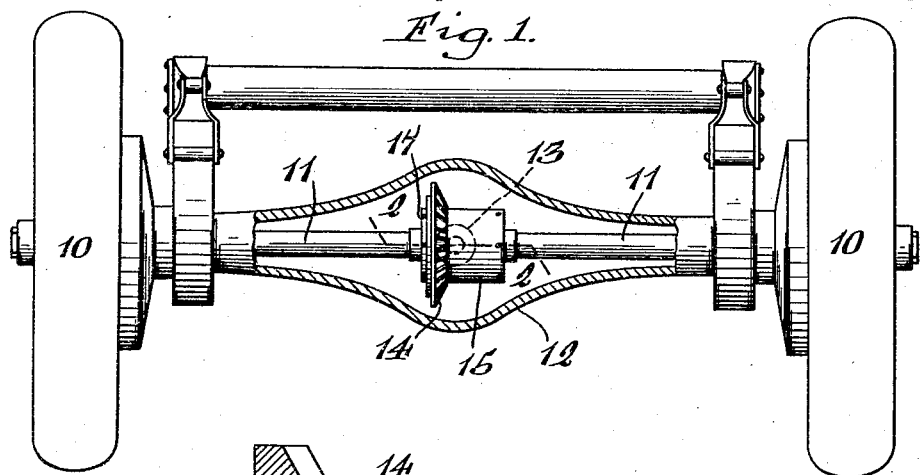
Figure 2:
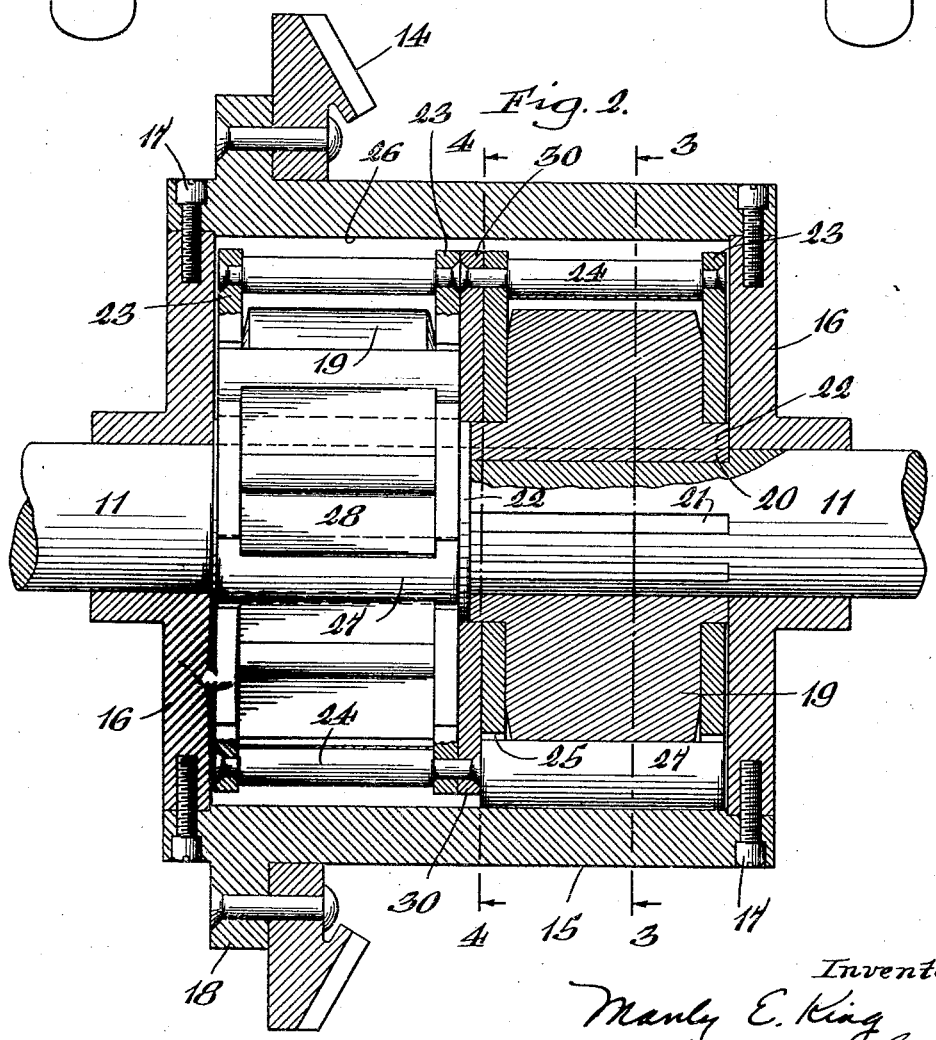

Figure 1 is a sectional rear view of an automobile chassis showing my improved differential drive mechanism applied thereto. Figure 2 is an enlarged longitudinal section taken in the plane of line 2—2, Figure 1. Figure 3 is a cross section taken on line 3—3, Figure 2, showing the drive rollers in their gripping position for transmitting motion to the axle. Figure 4 is a cross section taken substantially in the plane of lines 4—4, Figure 2, showing the drive rollers in their neutral or non-gripping position for effecting the differential action. Figure 5 is a perspective view of one of the springs for retaining the drive rollers in their correct position relative to the axle-hubs.

Similar characters of reference indicate corresponding parts throughout the several views.

By way of example, the invention has been shown in connection with the rear axle of a vehicle, 10 indicating the traction wheels, 11 their correspondingly alined axle-sections, 12 the usual housing therefor and 13 the propeller shaft pinion which engages the ring gear 14 of the differential assembly.

The opposing inner ends of the axle-sections are enclosed within a sleeve-like drive casing 15 closed at its ends by cover plates 16 fastened thereto by radial screws 17 or other equivalent fastening means. The ring gear 14 is riveted or otherwise secured to an attaching flange 18 formed on the casing, whereby motion is imparted to the latter and thence to the axle by a mechanism which is preferably constructed as follows:

Mounted on the opposing ends of the axle-sections 11 to turn therewith, and contained within the casing 15 in concentric spaced relation thereto, are hub members 19, 19 disposed side by side and having keys 20 formed thereon which engage corresponding key-ways 21 in the axle-sections. Each hub member is provided at its ends with bearing collars or extensions 22 which abut at their inner ends against each other while their outer ends abut against the casing-covers 16. Journaled on the collars of each hub for independently turning thereon is a roller cage consisting of roller-retaining rings 23 which are slightly less in diameter than the surrounding wall of the casing and which project somewhat beyond the peripheral faces of the hub member, as shown in Figures 2 and 3. These retaining rings are somewhat less in thickness than the length of their hub collars 22, so as to reduce to a minimum any frictional contact between these rings and the cover plate 16 of the casing.

The drive hubs 19 are free to turn independently of the surrounding roller cages or rings 23, the companion rings of a pair being joined at suitable intervals adjacent their peripheries by longitudinal tie-rods 24 so that they will move in unison. In their outer edges these rings are provided with a series of longitudinally-alined, radial notches or recesses 25 spaced equi-distant apart. In its inner wall the casing 15 has a plurality of arcuate or concave faces 26 which extend the full length of the casing, are equi-spaced, and correspond in number to the notches in the retaining rings 23, and are of a curvature somewhat less than that of the drive-hubs 19. Operating in the spaces formed between the drive hubs and the arcuate faces 26 of the casing and fitted at their ends in the ring-notches 25 are two annular rows of forward and reverse clutching elements 27 which are preferably in the form of rollers. It will be noted, as seen in Figures 2 and 3, that the ring notches 25 are of such a depth that the clutching rollers do not engage their bottoms but seat themselves on the peripheral faces of the drive hubs 19, the rollers having sufficient clearance laterally of the notches to afford them freedom of movement. When the rollers are disposed centrally relative to the arcuate faces 26 of the casing, there is sufficient clearance between such faces and the periphery of the respective drive-hubs that there is no gripping action performed by the rollers, but the same are in a neutral or non-motion transmitting position, as shown in Figure 4. When the rollers are not centrally in line with respect to such arcuate faces, they perform a clutching connection between the drive-hubs and the casing to positively transmit motion from the latter to the former.

As shown in Figure 2, each drive hub 19 is preferably chamfered at its opposite sides and adjacent to its periphery so as to prevent any binding of the cage-rings 23 with respect to the hub, as when the rollers 27 are in a gripping position.

In order to retain the rollers 27 in contact with the drive hubs 19 and prevent their being thrown outwardly by centrifugal force, when in a neutral position, I provide a yieldable means for preventing such displacement. Such means are preferably in the form of flat springs 28, each of which has a central seat or recess 29 for engaging the inner side of a corresponding tie rod 24, while its end portions bear against the adjoining rollers 27 disposed on either side of a given tie rod, as seen in Figure 3. As shown in said figure, the end portions of each spring bears against the opposing sides of adjoining rollers and at a point below where they contact with the arcuate faces 26 of the casing. The tension of these springs 28 constantly retains the clutching rollers in contact with the axle-hubs 19 and also holds the cage-rings 23 in the same relative position with the axle-hubs, while the drive casing 15 passes over the locking rollers from a forward to a backward or reverse locking position, and while affording these results, such springs are subject to a minimum wear and strain and are not subject to breakage.

Between the inner or contiguously disposed cage-rings 23, I place a substantially flat circular plate of the same diameter as said rings, which encircles the opposing extensions 22 of the respective hubs and which is composed of two substantially semi-circular sections 30, 30, one section being connected to the adjoining ring 23 of one of the drive-hubs, and the other section being joined to the companion ring of the other drive-hub. As shown in Figure 2, the connection of the plate-sections 30 to the respective rings 23 may be accomplished through the medium of the tie rods 24, whereby these plate-sections move in unison with the respective roller-cages. The opposing inner or diametric edges of the plate-sections do not meet but preferably terminate short of each other as indicated by the segmental space 31, so as to permit a limited circular movement of these plate-sections and their cage-rings relative to each other. As seen in Figure 4, the opposing edges of the plate sections which are cut away to provide the spaces 31 between them are cut along substantially radial lines. In connecting these plate-sections 30 with their companion roller cage rings 23, the latter are disposed in the same relative position to each other, one of the plate-sections being joined to its ring by the respective tie rods 24 and the other plate-section being joined to its ring in the same manner, thereby producing equal segmental spaces between the plate-sections at diametrically opposite sides of the hub-axis, so that the movement of the roller cage-rings 23, circumferentially and independently of each other, will be limited equally in both directions by the segmental spaces provided between the plate-sections 30, the adjoining edges of the plate-sections at one side of the axis abutting against each other in the released, non-gripping position of one of the roller-cages, while the diametric opposite edges thereof are spaced apart with the other roller-cage in its gripping position. The travel or throw of the clutching rollers 27 from a forward to a reverse locking position is comparatively small and the segmental space between the plate-sections, centrally in line with diametrically disposed rollers, should be about half the roller travel. This roller travel from a forward to a reverse locking position is so short, and the clearance at the middle of the arcuate faces 26 and the rollers so slight, that the impact upon the parts involved is very light and not noticeable in the vehicle when the unlocking from either position occurs.

In the operation of the differential mechanism, as the drive casing 15 is turned in a forward or reverse direction with the vehicle traveling in a straight course, the arcuate faces 26 of the casing pass over and impinge against the locking rollers 27, thereby firmly clutching the drive casing to the axle-hubs 19 and transmitting a forward or reverse motion to the axle-sections and wheels, each independently of the other. If the vehicle is directed out of its straight course and turns a corner, the outer traction wheel will obviously rotate faster than the inner one, and as a result its drive hub will be unlocked or released from the drive casing and the companion cage-rings 23 will carry its rollers to the center or neutral position of the arcuate faces 26, at which time the segment space 31 between the plate-sections 30 at one side of the hub-axis will have closed, as seen at the upper position of Figure 4, and the cage rings and rollers will be held at the released or non-gripping position, and the companion drive hub will then continue to turn relative to its roller-cage as long as the differential operation continues and the rollers of the other drive hub remain clutched. As soon as the vehicle is turned again to a straight course, the faster revolving wheel will automatically become clutched and be positively driven. In case the clutched or inner wheel, while the vehicle was turning a corner, would slip or skid circumferentially, the free or outer wheel would then automatically become locked to the driving casing.

I claim as my invention:—

1. A vehicle drive mechanism of the character described, comprising alined axle-sections having hubs on their opposing inner ends, a driving member mounted on the axle-sections and enclosing their hubs in concentric spaced relation thereto, clutching rollers disposed in the space between said hubs and said driving member for releasable engagement therewith, roller-retaining cages applied to the hubs for independent circumferential movement relative thereto and to the drive member, said rollers being arranged for gripping engagement with said hubs and driving member in their direct driving position and to be released from engagement with such parts in their differential drive position, and means disposed between the opposing ends of the roller cages and fixed to said cages, respectively, for limiting their movement equally in both circumferential directions, said means consisting of substantially semi-circular sections terminating short of their meeting edges to permit a limited relative movement of the sections.

2. A vehicle drive mechanism of the character described, comprising alined axle-sections having hubs on their opposing inner ends, a driving member mounted on the axle-sections and enclosing their hubs in concentric spaced relation thereon, the inner wall of said driving member having a plurality of equi-spaced gripping faces thereon, an annular row of forward and reverse clutching elements surrounding each of said hubs and adapted for releasable gripping engagement between the hubs and the opposing faces of the driving member, retaining cages for said clutching elements applied to but independently movable circumferentially relatively to said hubs, the clutching elements being adapted to occupy a neutral non-gripping position between the hubs and the driving member during a differential axle movement, and segmental shaped members disposed between the cages and secured thereto, respectively, for limiting their movement equally in both circumferential directions, said members abutting against each other in the neutral position of the clutching elements.

3. A vehicle drive mechanism of the character described, comprising alined axle-sections having hubs on their opposing inner ends, a driving member mounted on the axle-sections and enclosing their hubs in concentric spaced relation thereto, the inner wall of said member being polygonal in shape, an annular row of forward and reverse clutching elements surrounding each of said hubs and adapted for releasable gripping engagement with the hubs and the polygonal faces of the driving member, cages applied to each of said hubs in spaced relation for receiving the ends of their corresponding clutching elements, said cages being independently movable circumferentially relatively to their hubs to shift their clutching elements into and out of their gripping position, and plates disposed in the space between said cages and secured to the opposing faces thereof, respectively, said plates having a segmental space between them for permitting a limited circumferential movement of the cages relative to each other and abutting against each other along a radial line in the released, non-gripping position of the clutching elements.

4. A vehicle drive mechanism of the character described, comprising alined axle-sections having hubs on their opposing inner ends, a driving member mounted on the axle-sections and enclosing their hubs in concentric spaced relation thereto, the inner wall of the driving member having a plurality of gripping faces converging at their ends toward the hub-peripheries, bearing collars formed at the ends of said hubs, roller cages applied to said hub-collars in axially spaced relation for independent circumferential movement relative to the hubs for shifting their rollers into and out of gripping position between the hubs and the faces of the driving member, and a sectional plate disposed in the space between said cages, one of the plate-sections being secured to one of the cages and the other section being secured to the other cage, said plate-sections being segmentally spaced along their diametric edges for permitting a limited circumferential movement of the cages independently of each other and arranged to abut against each other along said edges in the released, non-gripping position of one of the roller-cages, while the other cage is in its released position.

5. A vehicle drive mechanism of the character described, comprising alined axle-sections having hubs on their opposing inner ends, a driving member mounted on the axle-sections and enclosing their hubs in concentric spaced relation thereto, the inner wall of the driving member having gripping faces converging at their ends toward the peripheral faces of the hubs, carriers mounted on the hubs for independent circumferential movement relative thereto, clutching elements applied to said carriers for releasable gripping engagement between the hubs and the faces of the driving member, said clutching elements having a limited radial movement in their carriers, and unitary means for yieldingly resisting movement of said elements outwardly from said carriers and for holding the carriers in the same relative positions on their hubs.

6. A vehicle drive mechanism of the character described, comprising alined axle-sections having hubs on their opposing inner ends, a driving member mounted on the axle-sections and enclosing their hubs in concentric spaced relation thereto, the inner wall of the driving member having gripping faces converging at their ends toward the peripheral faces of the hubs, carriers mounted on the hubs for independent circumferential movement relative thereto, clutching elements applied to said carriers for releasable gripping engagement between the hubs and the faces of the driving member, said clutching elements having a limited radial movement in their carriers, and spring means applied to said carriers and engaging the outer sides of said clutching elements for preventing outward displacement of the latter and for holding the carriers in the same relative positions on their hubs.

7. A vehicle drive mechanism of the character described, comprising alined axle-sections having hubs on their opposing inner ends, a driving member mounted on the axle-sections and enclosing their hubs in concentric spaced relation thereto, the inner wall of the driving member having gripping faces converging at their ends toward the peripheral faces of the hubs, carriers mounted on the hubs for independent circumferential movement relative thereto and each including a pair of rings having alining notches in their peripheral edges and tie rods connecting said rings, clutching rollers seated at their ends in said ring-notches for releasable gripping engagement between the hubs and faces of the driving member, and substantially flat springs applied to said tie rods and engaging said rollers for resisting outward displacement of the latter from their carrier rings and for holding said rings and the hubs in the same relative position during relative movement of the driving member, each of said springs having a central attaching portion for engagement with a corresponding tie rod and end portions arranged to engage the outer sides of adjoining clutching rollers.

MANLY E. KING.